June 19, 1928.
J. ROBINSON
1,674,521
AUTOMATIC TRAIN PIPE CONNECTER
Filed Sept. 6, 1921
2 Sheets-Sheet 1
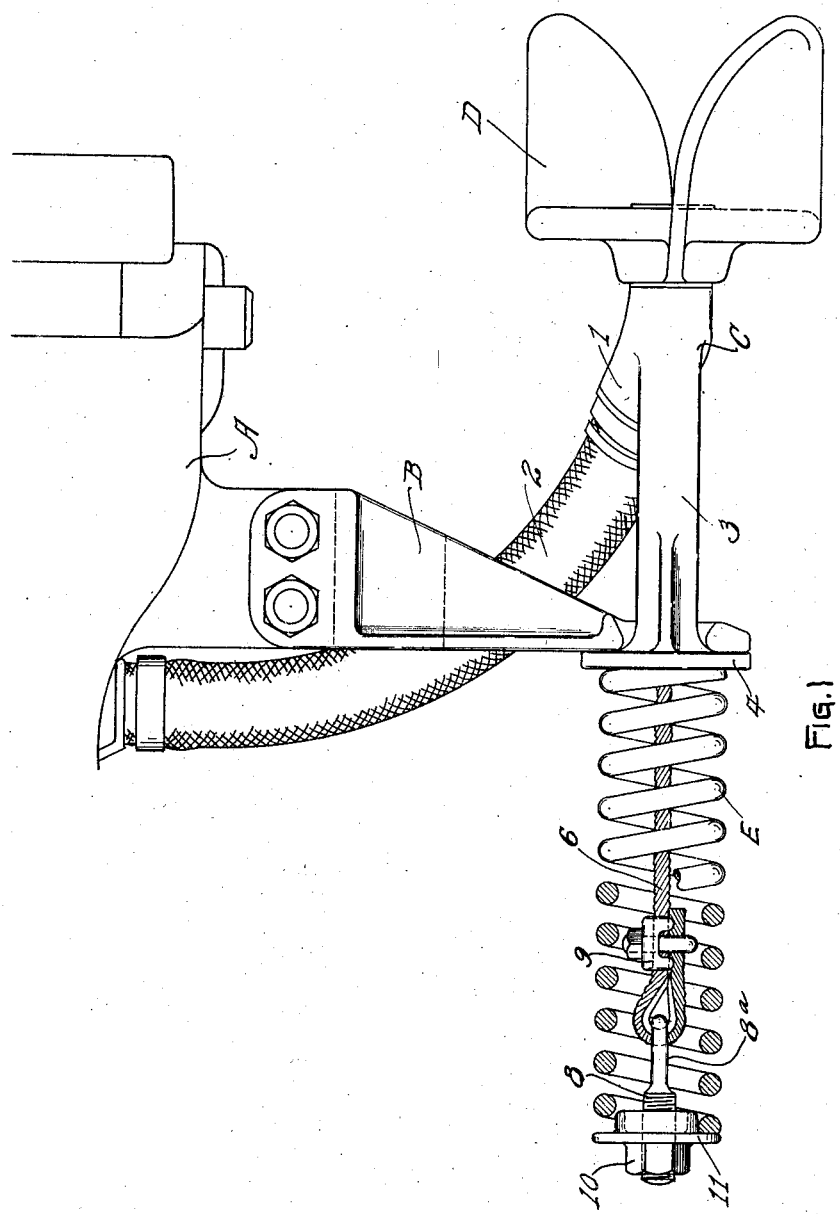

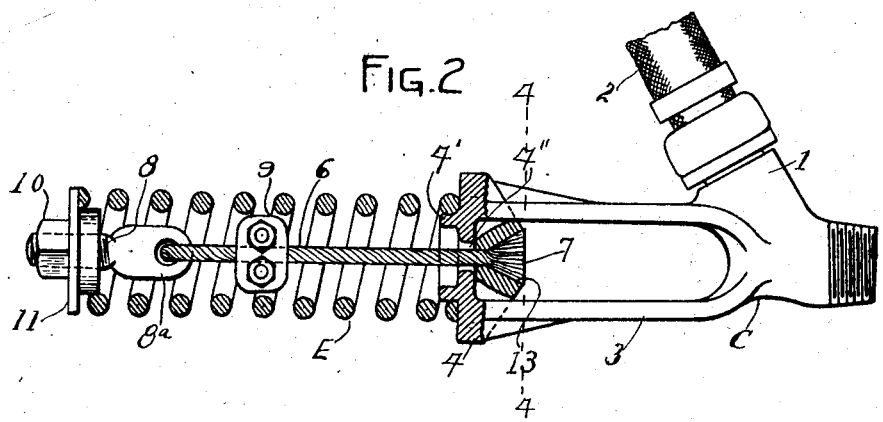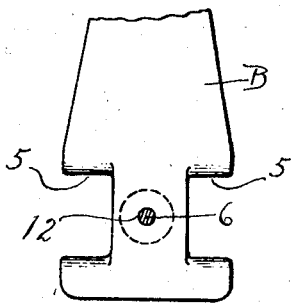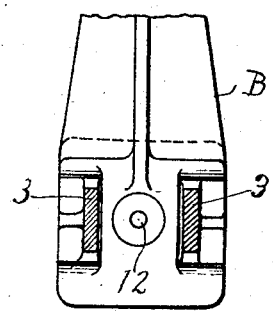

Patented June 19, 1928.

1,674,521

UNITED STATES PATENT OFFICE.

JOSEPH ROBINSON, OF MORRISTOWN, NEW JERSEY.

AUTOMATIC TRAIN-PIPE CONNECTER.

Application filed September 6, 1921. Serial No. 498,794.

The art of automatic train pipe connecters discloses that I have developed and refined a type of connecter which comprises as its principal features a supporting bracket for the coupling devices, the latter including a coupling member carried by said bracket, a buffer spring for yieldingly supporting the coupling member in a normal alining position to mate or couple with a corresponding coupling member and provisions for universal movement of the coupling member, with its coupling head upon the supporting bracket therefor.

My Letters Patent, No. 1,245,797, granted November 6, 1917 exemplify in a general way connector means of the class above referred to, and my pending application, Serial No. 364,401 filed March 9, 1920 discloses the special form of connector to which the improvements hereinafter set forth are directly related, the same being applicable, however, to other general types of connecters as will become apparent later on when my present invention is understood.

In the construction to which I have referred, I utilize a means for attaching or tying the buffer spring of the connecter to the supporting bracket, allowing the desired universal movement of the coupling member and its head, which tying means has a special connection with the bracket by a bearing which prior to this invention has been one involving movability of the tying means relatively to the bracket. Since my buffer and holding spring is under considerable compression normally and greater compression in the operation of the connecter under varying conditions of service in practice, the said bearing is necessarily one that generates a very considerable amount of friction under stresses. Naturally the foregoing has a tendency to detract somewhat from the greatest flexibility and freedom of action greatly to be desired, a difficulty which I wish to obviate, and at the same time obtain other advantages that will be apparent to those versed in the art.

With the foregoing in mind, the aim of my present invention has been to design a connecter affording the required universal movement of the coupling member relative to the supporting bracket therefor, involving a tying member for the buffer spring having a frictionless or immovable bearing upon the bracket element. More specifically speaking, I utilize a means of this sort consisting of a flexible body equipped with a bearing element in the zone of universal movement of the coupling member and co-operating with the bracket, and wholly immovable respecting the same. This element is also equipped with suitable means for engaging the spring for the purposes stated, and as a most simple, practical and preferable means useful for the purposes of my invention, I use a cable section, the inherent flexibilty of which is especially advantageous to enable the universal movement of the coupling member and its head notwithstanding the immobility of the bearing element of said cable section respecting the bracket with which it is engaged.

I do not wish, however, to be understood as confining myself to the employment of a flexible cable section in the foregoing connection for it is within the range of my invention to employ other means of an equivalent nature so long as the bearing portion or element provided therefor does not have movable contact with the bracket support.

My invention in its preferred embodiments is illustrated in the accompanying drawings, in which:—

Figure 1 is a side elevation of a train pipe connecter and means for supporting the same upon a car, depicting the cable section form of the tying member, or connection intermediate the bracket, spring, and coupling member parts.

Figure 2 is a horizontal section through the coupling, the coupling head omitted.

Figure 3 is a fragmentary view of the lower portion of the bracket in rear elevation, the cable connection being shown in section.

Figure 4 is a section taken about on the line 4—4 of Figure 2, the supporting bracket partly broken away.

Since the train pipe coupling means to which my invention relates is in the main of a construction commonly in use and known as the "Robinson connecter" I shall not describe in detail the general features except as they are involved in the presentation of the improvements hereof.

The connecter illustrated is preferably supported on the car coupler A and depending bracket B. The train pipe connecter proper is comprised of the coupling member C, having at its front end the coupling head D, and provided at its rear end with the cooperating buffer spring E. The coupling member C consists primarily of the pipe 1 from which leads off the conduit 2, and a body portion which includes the spaced sides or straps 3. At its rear end the member C is formed with a projection or abutment 4 adapted to bear against the rear side of the bracket B at the lower end of the latter, the spring E engaging with a reduction or shoulder 4' of said abutment 4.

The lower end of the bracket B is notched or recessed at opposite sides as shown best at 5 in Fig. 3 and the recessed portions are adapted to slidingly receive the sides or straps 3 of the coupling member C. The parts B, C and E are held in proper assembled positions as shown, by means of the connection or tie member 6, the form of which is the essential feature of this invention. The said tie member 6 preferably consists of a cable section at the front end of which is provided the bearing, enlargement, or head 7, see Fig. 2, said head 7 being made preferably by separating the strands of the cable and moulding a tough metal thereinto as shown, said metal being preferably bronze or malleable iron, for example. At its rear end the cable or tie member 6 is looped through the eye of an eye-bolt 8, and the extremity of the cable is clamped to the body by a suitable clamp 9, or otherwise fastened, this being an immaterial detail. A nut 10 with a suitable bearing element 11 to engage the rear end of the spring E is adapted to be screwed on the eye-bolt 8, and the said bolt is flattened at 8ª to receive a spanner wrench for holding the bolt against rotation when the nut 10 is screwed to compress the spring E. To assemble the several parts of this connector, the bracket B is turned properly and inserted at its lower end between the straps 3 of the member C, and then given a quarter rotation to assume the relation illustrated most clearly in Figs. 2 and 4. Thereafter, the tie member 6 is passed through the aperture 12 between the recesses 5 of the bracket and the aperture 4'' of the abutment 4, and its end fastened to the eye-bolt 8 as by the means 9, or otherwise. Then the spring E is emplaced so that it bears at one end against the rear end or abutment 4 of the coupling member C, and the nut 10 is screwed on the bolt 8 sufficiently to bring the spring E to the proper state of compression.

It will be evident from the foregoing that when the parts are thus assembled, free universal movement of the member C and its head D, relatively to the bracket B is permitted. During any such movement the tie member or connection 6 is free to flex laterally in all directions from the point of its bearing against the bracket B, (which bearing is obviously in the zone of said universal movement), it being evident that said bearing is established by the seating of the head 7 of the tie member in a recess 13 on the front side of the lower end of the bracket. The recess 13 is concentric, practically speaking, with respect to the opening 12, and the corresponding opening 4'' in the rear end or abutment portion 4 of the member C. During any such universal movement of the member C and supported parts, the head 7 is immovable or stationary, and therefore there is no friction generated between the parts 6 and B, and consequently no possibility of wear at this particular point. The displaceability of the head 7 is not interfered with, so the advantages of the device as regards ease of assemblage, adjustment, etc., are fully preserved.

The coupling member C and certain supported parts are slidable back and forth on the bracket B, and otherwise movable, with the straps or sides 3 operating in principal contact with the lower walls of the recesses 5. In view of the above construction there is no possibility of the coupling member C lowering and causing abrasion or rubbing with respect to the tie member; nor is there entailed any likelihood of sagging of the tie member by the weight of the coupling head resting thereon or engaging therewith.

Having thus described my invention, what I claim as new is:

1. In a train pipe connecter of the class described, a supporting bracket, coupling member, and buffer spring assembly, in which the coupling member has a bearing against the bracket, tying means to hold the parts of said assembly in proper relation comprising a part co-acting with the spring and bracket and having a bearing at the side of the bracket opposite the spring and stationary against the bracket during the normal operation of the connecter.

2. A connecter substantially as described in claim 1 in which the tying member is a flexible part.

3. A bracket, buffer spring and coupling member assembly for train pipe connecters, wherein the coupling member has universal movement relatively to the bracket, combined with a connecting part tying the elements of the assembly together but permitting the movement stated, the connecting part comprising a flexible body having bearings against the spring and the bracket so formed and arranged as to be stationary relatively to the spring and bracket at the points of said bearing during normal operation of the connecter.

4. In a train pipe connecter, a supporting bracket, coupling means including a coupling member mounted on said bracket for relative universal movement and having a bearing at one side of the bracket, a spring engaging the coupling member to hold it in alining position on the bracket, and a cable section connected at one end with the spring and engaged at the other end with the bracket.

5. A connecter as claimed in claim 7 in which the cable section is stationary at the point of its engagement with the bracket during normal operation of the connecter but displaceable at said point.

6. In a train pipe connecter, the combination with a supporting bracket having recessed sides, of a coupling member comprising spaced straps received in the recesses of said sides, having universal movement therein, and supported from downward movement thereby, a spring engaging the coupling member to hold the same engaged with the bracket at one side of the latter, and a tie member connected at one end with the spring and having a bearing at the opposite side of the bracket that is stationary during normal operation of the connecter.

7. In a train pipe connecter, the combination of a bracket, a coupling member universally movable thereon, and connecting means between the two including a spring holding the coupling member engaged with one side of the bracket, a cable tie member for tying the spring, bracket, and coupling member together in operative relation, adjustable means connecting the tie member and spring for varying the compression of the latter, and including a portion for holding the tie member against rotation during the adjustment, and a bearing intermediate the tie member and bracket.

8. In a train pipe connecter, a supporting bracket, coupling means including a coupling member mounted on said bracket for relative universal movement and having a bearing at one side of the bracket, a spring engaging the coupling member to hold it in alining position on the bracket, and a cable section connected at one end with the spring and engaged at the other end with the bracket, the cable section being formed with a hardened bearing enlargement at the point of engagement with the bracket.

9. In a train pipe connecter of the class described, a bracket, a coupling device, the two comprising relatively movable parts permitting universal movement of the coupling device, and the coupling device including a buffer spring for the customary purposes of such connecters, and means to tie said spring to the bracket comprising a single member attached to the spring, having a bearing on the bracket fixed against movement incident to movements of the coupling device, the tying means consisting of a cable secured at one end to the spring and free to flex laterally during movement of the coupling device under service conditions.

10. In apparatus of the class described, the combination, with a coupling member and a supporting bracket therefor, of a spring engaging one of said parts and having a connection with the other for stressing the coupling member toward an operative position, said connection of the spring being flexible throughout its length and of greater flexibility than the spring.

In testimony whereof I affix my signature.

JOSEPH ROBINSON.